Feb. 12, 1935.  F. L. FRAIZER  1,990,821
TRACTOR HITCH
Filed June 6, 1932  3 Sheets-Sheet 1
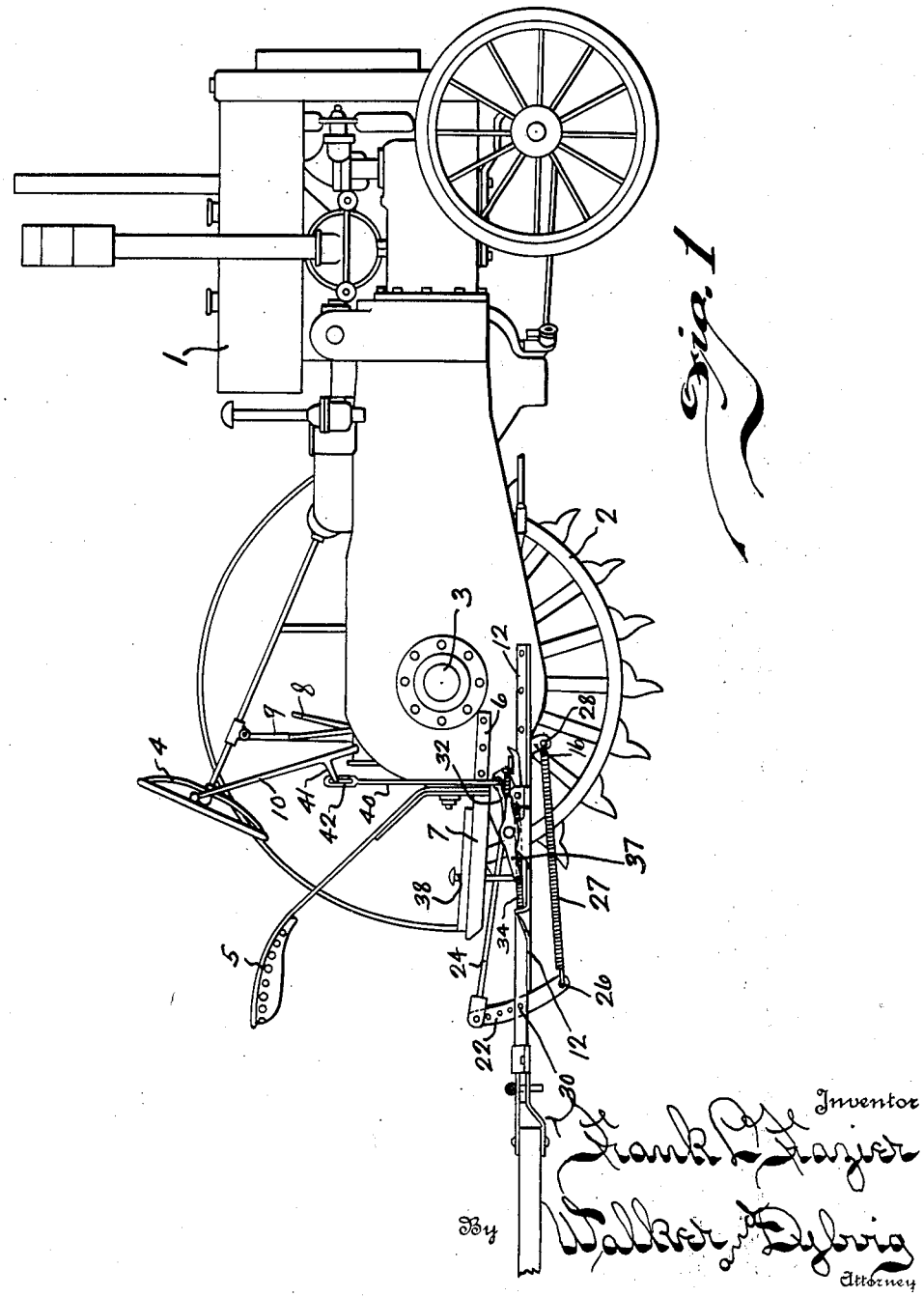

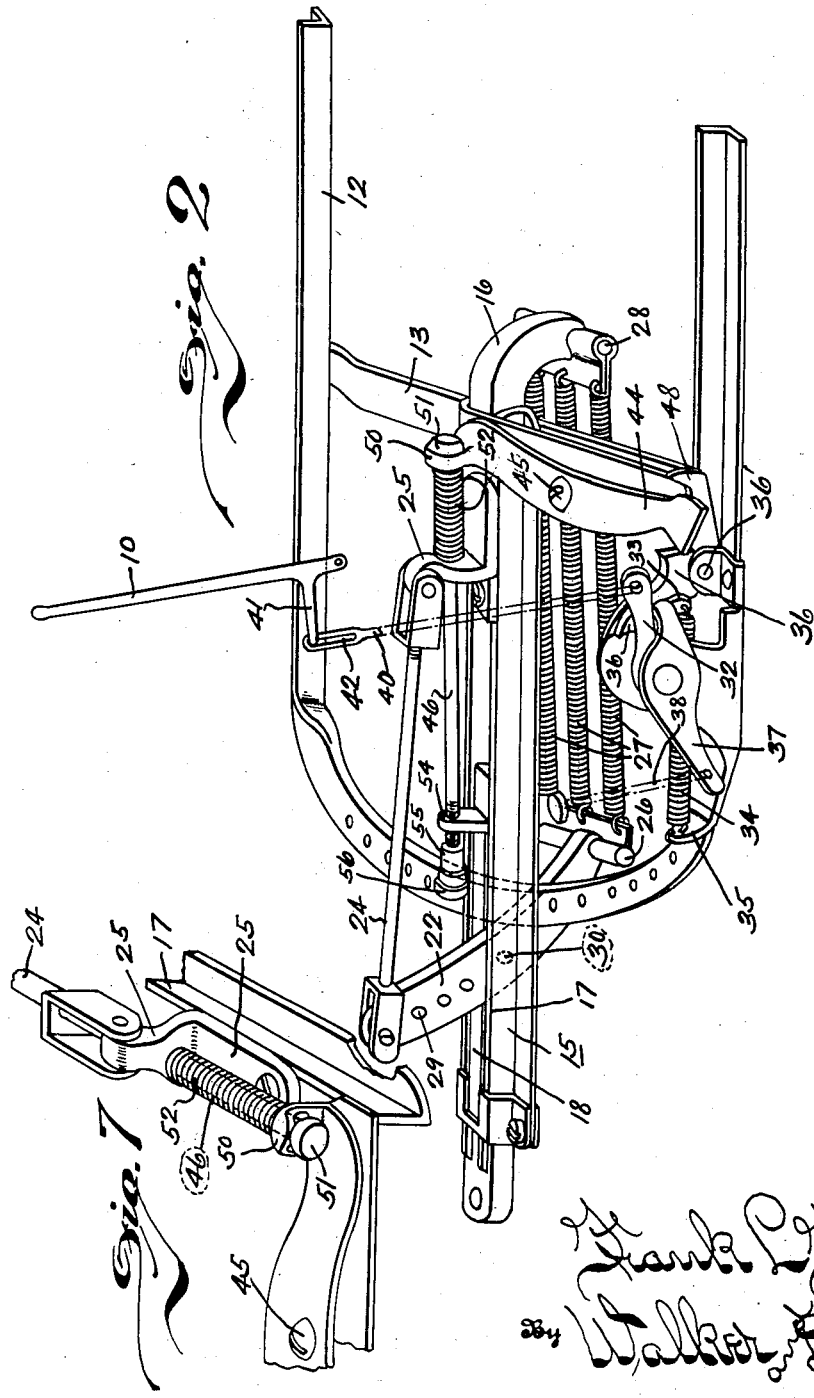

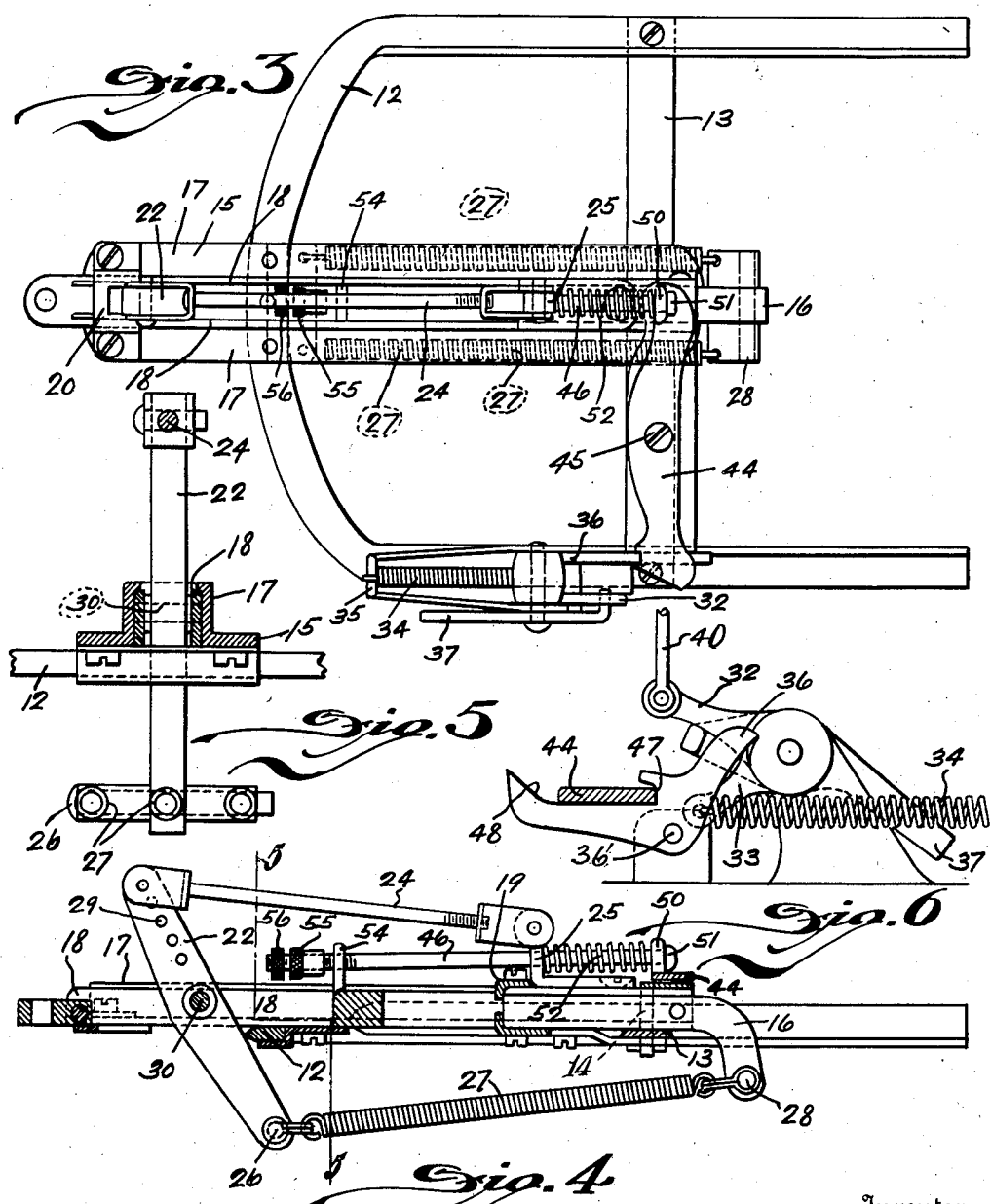

Patented Feb. 12, 1935

1,990,821

UNITED STATES PATENT OFFICE 1,990,821

TRACTOR HITCH

Frank L. Fraizer, Troy, Ohio, assignor of one-half to John R. Marshall, Troy, Ohio Application June 6, 1932, Serial No. 615,610

23 Claims. (Cl. 180—14.5)

This invention relates to automatic hitches for power tractors, and more particularly to a safety overload device for automatically arresting the tractor when the draft resistance exceeds a predetermined degree.

Not infrequently abnormal conditions are encountered in the operation of tractors employed for drawing a plow, a scraper, excavator, or other apparatus, or for ordinary hauling, wherein a stone, stump or other obstruction tends to arrest the drawn implement or device and thereby unduly increases the draft strain upon the implement and the tractor as well as the intermediate coupling member. Unless the operator is able to instantly stop the tractor, breakage of the apparatus or coupling is sure to result. Various forms of releasable hitches have been heretofore devised as well as other forms of tractor arresting mechanism.

In the present embodiment, means is provided for actuating a control element of the tractor whether it be the clutch control lever, a control pedal or other operative member from an operative to inoperative condition by actuating or power means other than the draft strain, which, in the present instance, is employed only for tripping or otherwise setting in operation the independently operable arresting mechanism. The device is thus not dependent upon the degree of draft resistance or overload strain and will operate quickly and with equal facility if the predetermined draft resistance is exceeded but slightly as when it is greatly exceeded. The means for actuating the tractor control element from its normal operative to arresting or inoperative position, and the resetting means for such arresting device is entirely independent of the draft overload mechanism which is employed merely to operate a release detent pertaining to the arresting device.

The object of the invention is to simplify the construction as well as the means and mode of operation of automatic strain operated arresting mechanism for power tractors whereby such mechanism will not only be cheapened in construction, but will be more efficient in use, positive in operation, uniform in action, automatic and unlikely to get out of repair.

A further object of the invention is to provide automatic draft operated arresting means for a power tractor which will comprise but few parts, of sturdy construction, and of unitary design, enabling it to be applied to existing tractors with minimum effort and disturbance of the tractor structure.

A further object of the invention is to provide such automatic overload mechanism which may be assembled as a unit to facilitate its application to existing tractors by unskilled labor.

A further object of the invention is to provide such automatic strain operated mechanism having a comparatively wide range of adjustment, enabling it to be accurately set for predetermined draft resistance operation.

A further object of the invention is to provide such overload operated or strain control mechanism including a draft connection which may be adjusted to various angular positions to the line of travel of the tractor, and which will be equally operative in any of such positions of adjustment.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawings, wherein is shown the preferred but obviously not necessarily the only form of embodiment of the invention, Fig. 1 is a side elevation of a popular type of tractor to which the present invention has been applied, the tractor drive wheel on the near side being removed to better disclose the relative location and connecting parts of the present apparatus. Fig. 2 is a perspective view of the strain or overload controlled apparatus forming the subject matter hereof. Fig. 3 is a top plan view, and Fig. 4 is a longitudinal sectional view of the assembled mechanism removed from the tractor. Fig. 5 is a transverse sectional view on line 5—5 of Fig. 4. Fig. 6 is a detail view of the operative connection between the adjustable pull rod and the trip lever as will be hereafter explained. Fig. 7 is a detail side view of the actuator means for the tractor control member.

Like parts are indicated by similar characters of reference throughout the several views.

Referring to the accompanying drawings, there is shown a typical style of farm tractor 1, of which 2 is one of the drive wheels and 3 the axle or spindle for a like wheel upon the adjacent side of the machine. The operator's seat 5 is supported upon the rear end of the tractor frame, while 4 is the steering wheel within easy reach of the operator.

Projecting rearwardly from the frame or chassis of the tractor beneath the operator's seat 5 and supported upon horizontal bars 6 bolted to the tractor chassis, is a foot board or platform 7. Projecting above the frame of the tractor and adjacent to the steering wheel 4 are respectively the throttle lever 8, the spark lever 9 and the clutch control lever 10, which, in the present instance, is operatively connected with the overload strain controlled apparatus so that the clutch lever will be automatically retracted to disengage the driving clutch when ever the drawn implement encounters an obstruction which offers excessive resistance.

Located beneath the platform 7 with its parallel arms bolted to the frame or chassis of the tractor, is a U shaped yoke 12 which is ordinarily provided for the attachment of a drawn implement or vehicle which is to be coupled to such rearwardly extending U shaped yoke 12.

As thus far described, the structure is that of a conventional form of farm tractor which, per se, forms no part of the present invention. The mechanism forming the subject matter hereof is mounted upon the U shaped yoke 12. Extending transversely across the yoke 12 is a transverse supporting bar 13 to which is pivotally attached upon a vertical trunnion stud 14 (Fig. 4) a longitudinally slotted draw bar 15 which rests upon the transverse portion of the U shaped yoke 12 and may be adjusted to and fro thereover about its pivotal connection with the transverse bar 13 into various angular positions as may be necessary to accommodate different implements or drawn vehicles and when turning corners or changing the direction of travel of the tractor and drawn device.

This slotted telescopic draw bar 15 comprises a primary member preferably, though not necessarily, formed of parallel spaced angle bars interconnected at their opposite ends by spacers or headers, the rearmost spacer being formed into a downwardly projecting arm 16 positioned beyond, that is forwardly, of the transverse mounting bar 13 and the pivotal connection 14 of the drag bar thereto. Mounted intermediate the spaced parallel angle bars 17, comprising the primary member of the drag bar, are two parallel spaced bars 18, also interconnected with each other at their opposite ends and having sliding longitudinal movement relative to the bars 17. At their forward end, or that toward the pivotal connection of the drag bar, these longitudinally movable inner bars 18 are provided with a spacer member 19 having overhanging sliding engagement with the respective angle bars 17 at each side of the reciprocatory bars 18. At the rear or outer end of the primary member of the drag bar, these inner reciprocatory draft bars 18 are slidingly mounted in the spacer head 20, connecting the ends of the bars 17, and the bars 18 carry therebeyond a clevis, draw head, or other coupling member as may be required. The inner parallel spaced draft members 18 are thus capable of reciprocatory movement intermediate the outer or primary draft members 17 and independently thereof, but are subject to swinging movement about the pivotal connection of the bars 17 with the transverse supporting member 13 in unison with the movement of said members 17.

Extending intermediate the reciprocatory draft bars 18 and pivotally connected thereto at a midlength point, but wholly independent of the outer or primary draft members 17, is an amplifying lever 22, the upper end of which is fulcrumed in one end of a link or tie rod 24, the opposite end of which is pivoted to a supporting bracket 25 fixedly secured to the primary draft members 17. The lower end of this amplifying lever 22 is provided with a cross arm or rod 26 connected by multiple helical tension springs 27 with a corresponding cross rod or transverse arm 28 carried by the dependent bracket arm 16, which, as before stated, is fixedly secured to the forward or inner end of the draft bar structure.

The telescopic draw bar comprising the spaced relatively sliding members 17 and 18 together with the amplifying lever 22 and its fulcrum connections 24 and 25 at one end of the lever, and the spring connections 27 connecting the opposite end of the lever 22 with the bracket arm 16, comprise a unitary structure which is freely movable to and fro about the pivotal connection of the draw bar with the transverse mounting bar 13 of the yoke 12. Any pulling strain upon the clevis or connection at the extremity of the inner bar members 18 is exerted upon the amplifying lever 22 against the retractive tension of the springs 27 tending to oscillate the lever 22 about its fulcrum connection with the link rod 24 and thereby extends the springs 27 against their inherent tension. The amplifying lever 22 is provided with a series of holes 29 in any one of which the link rod 24 may be pivoted to vary the leverage between the pivotal connection 30 of the lever 22 within the reciprocatory bars 18 and such fulcrum connection of the lever with the link rod 24, thus enabling the tension springs 27 to resist a greater or less pulling strain.

The tractor arresting means operates to actuate the movable control member of the tractor, which in the present embodiment is the clutch release lever 10, wholly independent of the draft overload device heretofore described by which the arresting means is merely released for operation. Pivotally mounted at one side of the yoke 12 is an oscillatory operator arm 32 with which is connected a second rock arm 33 having attached thereto one end of a retractile helical spring 34, the opposite extremity of which is attached to a bracket 35 fixedly secured to the mounting yoke 12. The spring 34 tends to rock the operator arm 32 downwardly. A pivoted detent or pawl 36 pivoted at 36' to a supporting bracket upon the yoke 12, has engagement with a notch in the hub or head of the rock arms 32 and 33 to hold the arm 32 in an elevated position against the tension of the spring 34. To retract the operator arm 32 against the tension of the spring 34 to such position that the detent 36 will engage the notch in the hub or head to retain the arms in such position, there is provided a lever 37 pivoted concentrically with the rock arms 32 and 33, one arm of which lever 37 projects laterally beneath the operator arm 32, while the opposite arm of the lever 37 is connected with a push rod or pedal stem 38 projecting through the foot board or platform 7 within easy reach of the operator's foot. By depressing the pedal or push rod 38, the lever 37 is oscillated to lift the operator arm 32 from its depressed operative position to an elevated position where it is detained by the engagement of the pawl 36. The arm 32 is connected by a link 40 with an arm 41 projecting from the clutch control lever 10 of the tractor. The arm 41 has engagement in a slot 42 in the upper end of the connecting link 40 so that in normal operation of the tractor, the clutch lever 10 may be drawn rearwardly to disengage the clutch by manual effort without meeting with resistance from the connecting rod 40. However, when the operator arm 32 is released by disengagement of the detent pawl 36, and permitted to be retracted downwardly under the contractile effort of the spring 34, the pulling effort upon the rod 40 will automatically retract the clutch control lever 10 to disengage the driving clutch of the tractor. This operation is effected instantly upon the disengagement of the detent pawl 36 and is effected under the influence of the spring 34 wholly independently of the draft strain upon the drag bar. Thus whatever the character of the resistance encountered and whatever the power or speed of the tractor may be, the operating force applied to the retraction of the clutch control lever will always be the same and there is no possible danger of subjecting the clutch lever and its connected parts to undue stresses and strain. Moreover, whenever the detent pawl 36 is disengaged, the spring 34 acts instantly to retract the clutch control lever 10 and thus the arresting operation of the tractor is in no way dependent upon the degree of draft strain or overload transmitted to the drag bar.

In the present construction this draft overload strain is utilized to disengage the detent 36 whenever excessive strain is encountered.

For the purpose of disengaging the detent 36 under excessive load strain condition, there is provided a trip lever 44 pivoted at 45, one end of which has operative engagement with the detent pawl 36, while the other end is connected with a pull rod 46 actuated by the longitudinal movement of the inner draw bars 18 upon the movement of such bars against the tension of the springs 27. The detent pawl 36 is formed with a tail or extension, having at its end adjacent to the pivot of the pawl an undercut notch or shoulder 47 beneath which the end of the trip lever 44 is normally positioned to lock the pawl in engagement with the hub or head of the operator rock arm 32. At its opposite extremity the tail or arm of the detent pawl is provided with a cam face 48 engaged by the extremity of the trip lever 44 upon oscillation of the latter to disengage the pawl and thereby release the operator arm 32.

The opposite end of the trip arm 44, overhanging the pivotal point of the draw bar, is provided with an upstanding lip or flange 50 having therein a transverse slot through which the pull rod 46 projects and which is provided with an enlarged head 51 beyond such lip or flange. Such interconnection of the motion transmitting rod 46 with the trip lever 44 actuated thereby, is substantially concentric with the pivotal connection 14 of the draft bar with the frame bar 13. As expansion spring 52 is interposed between the bracket 25 mounted upon the drag bar and the upstanding flange or lip of the trip lever 44. The pull rod 46 extends through a suitable opening in the bracket 25 and at its forward end extends through a keeper or perforated lug 54 carried by the inner members 18 of the draw bar. The rod extends freely through such keeper or lug 54 so that the latter is capable of free sliding movement upon the rod within prescribed limits as the bars 18 reciprocate within the bar 17 against the tension of the retractile springs 27. Threaded upon the extremity of the pull rod 46 beyond the keeper or lug 54, is a stop collar or nut 55 secured by a lock nut 56.

Whenever the draft strain upon the sliding members 18 of the draw bar is sufficiently great to retract such members 18 and with them the amplifying lever 22 against the tension of the retractile springs 27 to such extent that the keeper or lug 54 carried by and moving with the bars 18, contact the stop collar or nut 55 upon the pull rod 46, such rod 46 is drawn longitudinally with further movement of the bars 18 thereby transmitting motion to the trip lever 44 which is actuated thereby against the tension of the spring 52. Such pulling effort tends to oscillate the trip lever out of its engagement beneath the overhanging shoulder of the detent pawl 36 and into engagement with the cam face 48 upon the extended tail portion of such detent pawl and thereby rocking the pawl out of engagement with the hub or head of the operator lever 32 and releasing the latter for actuating movement under the influence of the spring 34. Whenever the trip lever 44 has been oscillated sufficiently to disengage the detent pawl 36, regardless of whether by slight overload or greatly excessive strain, the clutch lever 10 will be automatically retracted under influence of the spring 34, acting through the arm 32 and link 40, but always with the same actuating power. The clutch being disengaged, the draft strain will be relieved and under ordinary conditions the retraction of the springs 27 will tend to draw the tractor itself rearwardly against the resistance of the encountered obstruction sufficient to relieve the tension. By depressing the foot pedal or push rod 38 and thereby oscillating the lever 37, the operator arm 32 can be reset preparatory to the next operation. Likewise the device may be reset by manually restoring the clutch lever 10, which, in its forward movement, will exert an upward pulling influence upon the connecting rod 40 connected at its lower end to the operator arm 32 thereby elevating such arm until the detent pawl 36 is reengaged.

The construction comprises a unitary assembly mounted upon the U-shaped yoke 12 which may be attached to any of the conventional forms of farm tractors. By changing the fulcrum connection of the link rod 24 with the amplifying lever 22, the device is readily adjusted to different overload strains to accommodate it to different operating conditions.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim

1. In an automatic overload control mechanism for tractors, a yielding hitch for a drawn implement, a movable control member for the tractor, spring tensioned actuating mechanism therefor, a detent normally maintaining the actuating mechanism in an inoperative condition, and trip means normally locking the detent against disengagement and operated by the excessive movement of the yielding hitch to unlock the detent by its initial movement and by further movement disengage the detent and release the actuating mechanism.

2. In an automatic overload control mechanism for tractors, a yielding hitch for a drawn implement, a movable control member for the tractor, a spring tensioned rock arm operatively connected with the control member and a pair of interlocking detent members normally locking the rock arm against oscillation, and operatively connected with the yielding hitch for disengagement from each other by initial excessive movement of the hitch under overload strain and cooperating to release the arm upon further yielding movement of the hitch.

3. In an overload control mechanism for tractors, a telescopic draw bar for connecting a tractor and a drawn implement, spring tension means for yieldingly resisting the extension of the telescopic draw bar under increasing load strains, including a lever to which the extensible portion of the draw bar is connected, a link to which the lever is fulcrumed connecting the lever with the other portion of the telescopic draw bar, spring tension means against which the lever is movable by the extension of the draw bar, and tractor arresting means controlled by the extension of the draw bar.

4. A tractor control apparatus including a supporting frame engageable with a tractor chassis, a draw bar mounted thereon for both a longitudinally extensible and retractible motion and lateral swinging motion, tractor arresting means, and operating means controlled by the extension of the draw bar independently of its swinging motion for effecting operation of the tractor arresting means in any position of lateral swinging motion of the draw bar.

5. A tractor control apparatus including a mounting engageable with a tractor chassis, a longitudinally extensible and contractible draw bar mounted thereon, a tension spring, an amplifying lever adjustably connecting the spring and draft bar to yieldingly resist extension of the bar, a tractor arresting means, actuating means therefor independent of the draft strain on said draw bar, and control means for said tractor arresting means governed by the degree of longitudinal extension of the draw bar.

6. A tractor control apparatus including a mounting, a longitudinally extensible and contractible draw bar pivoted to the mounting for to and fro lateral swinging motion, comprising reciprocatory and nonreciprocatory portions, a transverse lever to a medial portion of which the reciprocatory portion of the draw bar is connected, a fulcrum for said lever connected to the nonreciprocatory portion of the draw bar at one side thereof, a tension spring connecting the lever with such nonreciprocatory portion of the draw bar at the opposite side thereof, against which the movement of the reciprocatory portion of the draw bar is effected, and a tractor arresting means governed by the movement of the reciprocatory portion of the draw bar against the tension of said spring.

7. A tractor control apparatus including a mounting, a telescopic draw bar pivoted thereto for to and fro lateral swinging motion including a reciprocatory portion and a nonreciprocatory portion, a transverse lever carried by the draw bar and swingingly movable to and fro therewith, said lever being operatively connected with both portions of the draw bar, a spring against which the lever is operable by the reciprocatory movement of one portion relative to the other portion, and a tractor arresting means governed by relative movement of draw bar portions.

8. A tractor control apparatus including a mounting, a telescopic draw bar pivoted thereto for to and fro lateral swinging motion including a reciprocatory portion and a nonreciprocatory portion, a transverse lever carried by the draw bar and swingingly movable to and fro therewith, said lever being medially pivoted to the reciprocatory portion of the draw bar, a link pivotally connecting one arm of the lever with the nonreciprocatory portion of the draw bar, a tension spring yieldingly connecting the opposite arm of the lever also with the nonreciprocatory portion of the draw bar, and a tractor arresting means governed by the relative movement of the draw bar parts.

9. A tractor control apparatus including a reciprocatory draw bar, spring tension means against the yielding resistance of which the draw bar is extensible under draft strain influence, a tractor arresting means, a control member therefor, a trip rod disposed in telescopic relation with the reciprocatory draw bar, and adjustable stop means carried by one of said members and engaged by the other after predetermined relative movement of the draw bar, thereby permitting a predetermined degree of longitudinal movement of the draw bar portion independently of the control member, and upon further movement operating the control member to effect operation of the tractor arresting means.

10. In a tractor control apparatus, a telescopic draw bar, spring tension means against the yielding resistance of which the draw bar is extensible under draft strain influence, a spring actuated arresting means for the tractor operable independently of the draft strain influence, a normally locked detent therefor holding the arresting means in inoperative position, and tripping means operable by the extension of the draw bar for initially unlocking the detent and by further operation releasing the tractor arresting means for independent operation.

11. In a tractor control apparatus, a spring actuated tractor arresting means operable independently of the draft strain influence, a detent normally holding the arresting means in an inoperative condition, having a locking notch therein, a cam surface thereon in spaced relation with the notch, a draw bar subject to draft strain influence, and tripping means for the detent operative by the draft strain influence upon the draw bar normally engaged in the notch and movable therefrom onto the cam surface to release the tractor arresting means for independent operation.

12. In a tractor control apparatus, the combination with a tractor control member, of a spring actuated operator, an actuating spring therefor, a rod differentially connecting the operator with the tractor control member and having sliding connection with one of said members by which the control member is operable independently of the operator, and the movement of the operator will actuate the control member in one direction, a detent normally holding said operator in adjusted position with its actuating spring under tension, and means for automatically disengaging the detent by the draft strain upon the tractor when such strain exceeds a predetermined degree to enable the operation of the arresting means.

13. A draft device for vehicles including a telescopic draft bar having a relatively fixed portion and a portion mounted for reciprocatory motion relative to the fixed portion, a lever medially pivoted in transverse relation to the reciprocatory portion of the draft bar, a tension spring yieldingly connecting one arm of the lever with the relatively fixed portion and a tie member nonyieldingly connecting the opposite arm of the lever with the relatively fixed portion, whereby the retractive force of the tension spring will be amplified by said lever.

14. In a draft device of the character described, an extensible and contractable draft bar pivotally mounted for limited to and fro transverse swinging motion, yielding retractive means tending to contract the bar, a motion transmitting member responsive to extension of the draft bar, and an actuated member with which the motion transmitting member is connected substantially concentrically with the pivotal mounting of the draft bar, whereby the transmission of motion to the actuated member will be substantially uniform in various positions of swinging adjustment of the draw bar.

15. In a draft device for vehicles, an extensible and contractable draw bar pivotally mounted for to and fro swinging motion, an actuated member operated by the extension of the draw bar and an operative connection between the actuated member and draw bar having connection with the actuated member substantially concentric with the pivotal mounting of the draw bar.

16. In a tractor control apparatus, a spring actuated tractor arresting means, a detent normally holding the arresting means in inoperative condition, a stop shoulder on said detent, and a contact surface thereon in spaced relation with the stop shoulder, a movable control member engageable alternately in locking relation with the stop shoulder and in releasing relation with the contact surface upon the detent, and draft means operative under excessive strain to move said control member to initially unlock the detent and by further movement thereof disengage the detent to release the arresting means.

17. In an overload control mechanism for tractors, a reciprocatory draw bar for connecting a tractor with a drawn implement, tension amplifying means for yieldingly resisting longitudinal movement of the draw bar under increasing load strains, including a transverse lever to which the draw bar is connected, a swinging link to which the lever is fulcrumed connecting the lever with a stationary portion of the mechanism, spring tension means against which the lever is movable by longitudinal movement of the draw bar, and tractor arresting means controlled by such movement of the draw bar.

18. In an overload control mechanism for tractors, a reciprocatory draw bar for connecting a tractor with a drawn implement, tension amplifying means for yieldingly resisting longitudinal movement of the draw bar under increasing load strains, including a transverse lever to which the draw bar is connected, the interconnection of the bar and lever being variable to vary the leverage of the latter, and an adjustable fulcrum mounting for the lever at one side of the draw bar connected with a stationary part of the mechanism and a tension spring at the opposite side of the draw bar connecting the lever with a stationary portion of the mechanism against the yielding resistance of which the lever is movable by longitudinal movement of the draw bar, and tractor arresting means controlled by such movement of the draw bar.

19. A tractor control apparatus including a reciprocatory draw bar for connecting a tractor with a drawn implement, a tension spring, an amplifying lever adjustably connecting the spring and draft bar to yieldingly resist longitudinal movement thereof under increasing load strain, tractor arresting means, actuating means therefor independently of the draft strain on the draw bar, and control means for the tractor arresting means governed by the degree of longitudinal extension of the draw bar.

20. A tractor control apparatus including a mounting, a reciprocatory draw bar carried thereby for both reciprocatory and to and fro lateral swinging motion, a transverse lever carried by the draw bar and swingingly movable to and fro therewith, and having a fulcrum connection with the mounting, a spring against which the lever is operable by longitudinal movement of the draw bar, and tractor arresting means governed by the movement of the draw bar.

21. In a tractor control apparatus, a swinging carrier, a reciprocatory draw bar for connecting a tractor with a drawn implement mounted thereon for both reciprocatory and lateral swinging movement, an amplifying lever disposed transversely of the draw bar, a fulcrum connection for the lever with the mounting at one side of the draw bar, a tension spring connecting the lever with the mounting at the opposite side of the draw bar, and against the yielding resistance of which the draw bar is movable under increasing load strain, and a tractor arresting means governed by the movement of the draw bar.

22. In an automatic overload control mechanism for tractors, a yielding hitch for a drawn implement, a movable control member for the tractor, an actuator spring operatively connected with the tractor control member, a detent normally preventing operation of the tractor control member by the actuator spring, and a control member subject to overload strain upon the yielding hitch normally locking said spring controlling detent and operative by initial overload strain to unlock the detent and by further overload strain operating to disengage said detent to release the tractor control member actuating spring.

23. In an automatic overload control mechanism for tractors, a yielding hitch for a drawn implement, a movable control member for the tractor, spring means for automatically operating said tractor control member independently of the movement of the yielding hitch, a detent for holding the control member operating means in inoperative position, and a member movable with the yielding hitch upon excessive movement thereof having operative engagement with the detent in one position of adjustment for preventing the disengagement of the detent and thereby prevent release of the tractor control member operating means, and having operative engagement therewith when in an alternate position of adjustment for effecting disengagement of the detent to permit release of the tractor control member operating means.

FRANK L. FRAIZER.